US011853473B2

(12) United States Patent
Fix et al.

(10) Patent No.: US 11,853,473 B2
(45) Date of Patent: Dec. 26, 2023

(54) DIFFERENTIAL ILLUMINATION FOR CORNEAL GLINT DETECTION

(71) Applicant: Meta Platforms Technologies, LLC, Menlo Park, CA (US)

(72) Inventors: Alexander Jobe Fix, Seattle, WA (US); Clare Joyce Robinson, Bellevue, WA (US); Mohammadhossein Daraeihajitooei, Seattle, WA (US); Timo Stoffregen, Takaka (NZ)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/576,548

(22) Filed: Jan. 14, 2022

(65) Prior Publication Data

US 2023/0057514 A1    Feb. 23, 2023

Related U.S. Application Data

(60) Provisional application No. 63/234,621, filed on Aug. 18, 2021.

(51) Int. Cl.
*G06V 40/00* (2022.01)
*G06F 3/01* (2006.01)
(Continued)

(52) U.S. Cl.
CPC .............. *G06F 3/013* (2013.01); *G06T 7/73* (2017.01); *G06V 40/19* (2022.01); *G06V 40/193* (2022.01); *H04N 23/56* (2023.01); *G06T 2207/10048* (2013.01); *G06T 2207/10152* (2013.01); *G06T 2207/30201* (2013.01)

(58) Field of Classification Search
CPC .. G06F 3/013; G06T 7/73; G06T 2207/10048; G06T 2207/10152; G06T 2207/30201; H04N 23/56
See application file for complete search history.

(56) References Cited

U.S. PATENT DOCUMENTS 7,884,977 B2 *   2/2011   Mori ...................... H04N 19/12
                                                            358/538
8,086,044 B2 * 12/2011   Feng ..................... H04N 19/176
                                                            382/220
(Continued)

OTHER PUBLICATIONS

Angelopoulos et al. ("Event-Based Near-Eye Gaze Tracking Beyond 10,000 Hz," in IEEE Transactions on Visualization and Computer Graphics, vol. 27, No. 5, pp. 2577-2586, May 2021, doi: 10.1109/TVCG.2021.3067784.*

(Continued)

*Primary Examiner* — Frank F Huang
(74) *Attorney, Agent, or Firm* — FREESTONE INTELLECTUAL PROPERTY LAW PLLC; Aaron J. Visbeek; William J. Pigott

(57) ABSTRACT

An apparatus, system, and method for detecting glints includes a pair of light sources positioned on a head-mounted frame and driven to illuminate a corneal surface of an eye with differential light signals. An image sensor is positioned on the head-mounted frame to receive reflections of the differential light signals from the corneal surface. An orientation of a cornea (e.g., corneal sphere) of the eye may be determined at least partially based on the reflections of the differential light signals.

18 Claims, 6 Drawing Sheets

(51) Int. Cl.
    *G06T 7/73*      (2017.01)
    *H04N 23/56*      (2023.01)
    *G06V 40/19*      (2022.01)
    *G06V 40/18*      (2022.01)

(56) References Cited

U.S. PATENT DOCUMENTS

| | | | |
|---|---|---|---|
| 8,878,773 B1 * | 11/2014 | Bozarth | G06T 7/74 |
| | | | 382/103 |
| 9,274,597 B1 * | 3/2016 | Karakotsios | G06F 3/0346 |
| 9,557,568 B1 * | 1/2017 | Ouderkirk | B29D 11/00644 |
| 10,217,286 B1 * | 2/2019 | Angel | G06F 3/013 |
| 10,466,484 B1 * | 11/2019 | Yoon | H04N 13/332 |
| 10,466,779 B1 * | 11/2019 | Liu | G06T 19/006 |
| 10,502,963 B1 * | 12/2019 | Noble | B29D 11/0073 |
| 11,176,367 B1 * | 11/2021 | Fix | G06V 10/141 |
| 2008/0143820 A1 * | 6/2008 | Peterson | G06T 11/60 |
| | | | 348/E7.001 |
| 2008/0212942 A1 * | 9/2008 | Gordon | H04N 21/4334 |
| | | | 348/E7.071 |
| 2009/0196460 A1 * | 8/2009 | Jakobs | G06V 40/19 |
| | | | 382/103 |
| 2011/0234750 A1 * | 9/2011 | Lai | G03B 37/04 |
| | | | 348/E7.001 |
| 2012/0249957 A1 * | 10/2012 | Shibata | A61B 3/0025 |
| | | | 351/206 |
| 2012/0250980 A1 * | 10/2012 | Gillard | H04N 5/272 |
| | | | 382/173 |
| 2012/0254369 A1 * | 10/2012 | Gillard | H04N 21/4756 |
| | | | 709/219 |
| 2012/0257005 A1 * | 10/2012 | Browne | G02B 27/017 |
| | | | 348/E7.001 |
| 2013/0182066 A1 * | 7/2013 | Ishimoto | E02F 9/261 |
| | | | 348/38 |
| 2014/0037213 A1 * | 2/2014 | Niederberger | G06V 20/00 |
| | | | 382/195 |
| 2014/0049452 A1 * | 2/2014 | Maltz | G02B 27/017 |
| | | | 345/8 |
| 2016/0029883 A1 * | 2/2016 | Cox | G06V 40/19 |
| | | | 351/209 |
| 2016/0085300 A1 * | 3/2016 | Robbins | H04N 5/232123 |
| | | | 345/633 |
| 2016/0241892 A1 * | 8/2016 | Cole | H04N 21/816 |
| 2016/0342205 A1 * | 11/2016 | Shigeta | A61B 5/18 |
| 2017/0070711 A1 | 3/2017 | Grundhofer et al. | |
| 2017/0205876 A1 | 7/2017 | Vidal et al. | |
| 2017/0323167 A1 | 11/2017 | Mapen et al. | |
| 2018/0046859 A1 * | 2/2018 | Jarvenpaa | H04N 5/332 |
| 2018/0205937 A1 | 7/2018 | Zhu et al. | |
| 2018/0275409 A1 * | 9/2018 | Gao | H04N 13/332 |
| 2018/0307048 A1 * | 10/2018 | Alexander | G03H 1/26 |
| 2019/0051004 A1 | 2/2019 | He et al. | |
| 2019/0086674 A1 * | 3/2019 | Sinay | G02B 27/283 |
| 2019/0226836 A1 | 7/2019 | Rudd et al. | |
| 2019/0356385 A1 | 11/2019 | Jang et al. | |
| 2020/0183174 A1 * | 6/2020 | Noui | G02B 27/0172 |
| 2020/0368616 A1 * | 11/2020 | Delamont | A63F 13/213 |
| 2021/0011284 A1 * | 1/2021 | Andreev | G02B 27/0025 |
| 2021/0041948 A1 * | 2/2021 | Berkner-Cieslicki | |
| | | | G06F 3/011 |
| 2021/0212601 A1 | 7/2021 | Neal et al. | |
| 2022/0197376 A1 * | 6/2022 | Boyle | G02B 27/0093 |
| 2022/0382064 A1 * | 12/2022 | Rohn | G02B 1/002 |
| 2022/0394234 A1 * | 12/2022 | Etigson | G02B 30/10 |
| 2022/0397956 A1 * | 12/2022 | Lundell | G02B 27/0093 |
| 2022/0413302 A1 * | 12/2022 | Meitav | H04N 5/2256 |
| 2022/0413603 A1 * | 12/2022 | Held | H04N 5/2256 |

OTHER PUBLICATIONS

Herbert et al. ("Characterization setup for event-based imagers applied to modulated light signal detection," Applied Optics—Feb. 2019.*
Ebisawa "Unconstrained pupil detection technique using two light sources and the image difference method Visualization and Intelligent Design in Engineering and Architecture", (1995), pp. 79-89.*
Non-Final Office Action dated Jan. 31, 2023 for U.S. Appl. No. 17/576,775, filed Jan. 14, 2022, 6 pages.

* cited by examiner

DIFFERENTIAL ILLUMINATION FOR CORNEAL GLINT DETECTION

CROSS-REFERENCE TO RELATED APPLICATIONS

This application claims priority to U.S. provisional Application No. 63/234,621 filed Aug. 18, 2021, which is hereby incorporated by reference.

TECHNICAL FIELD

This disclosure relates generally to glint detection, and in particular to illumination for glint detection systems.

BACKGROUND INFORMATION

Eye tracking inaccuracies can undermine a user's trust in a system that relies on an eye tracking system. For example, if an eye tracking system is used for a head-mounted display, inaccurate eye tracking could make the system less enjoyable to use or less functional.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
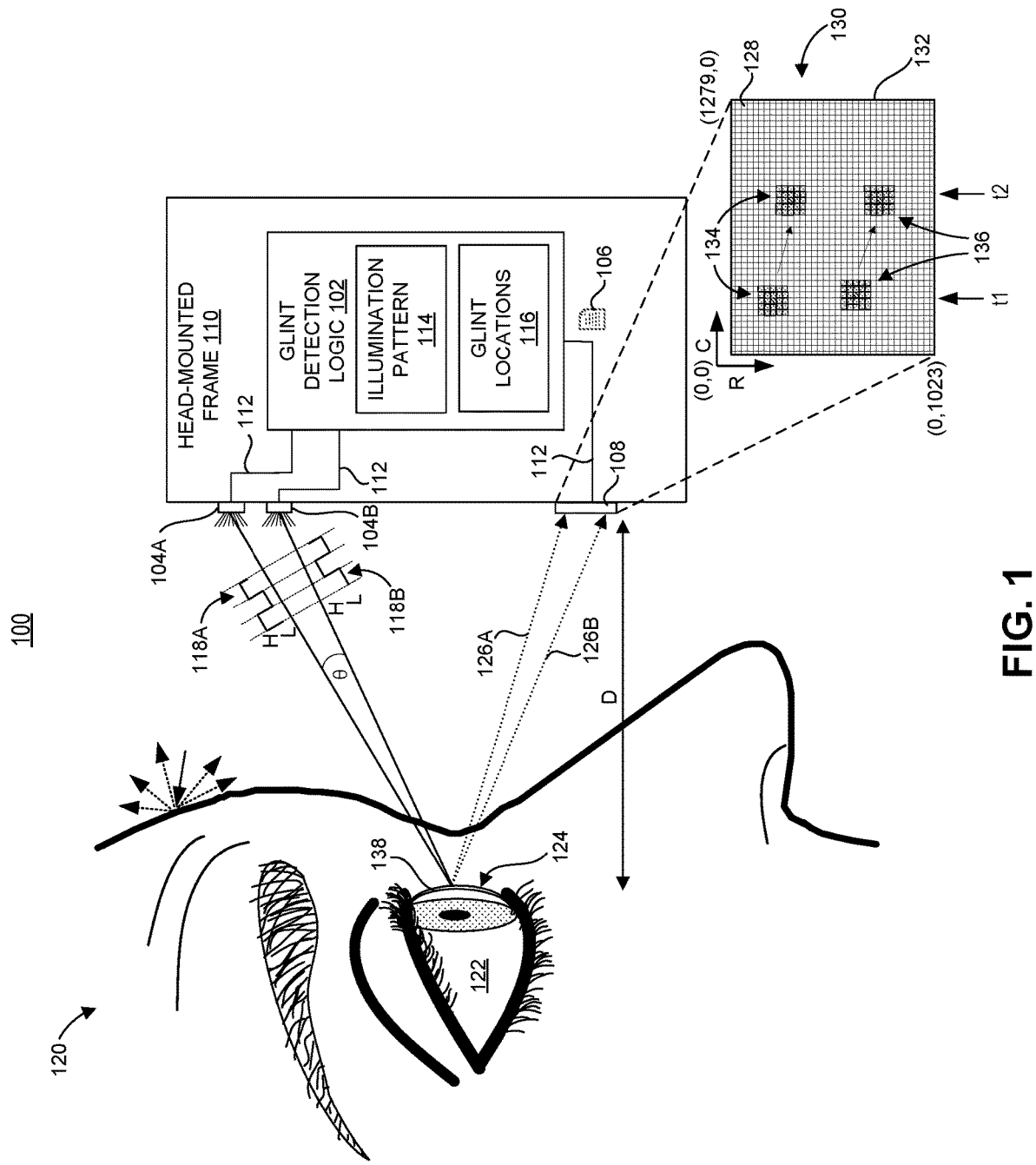
FIG. 1 illustrates a glint detection system, in accordance with aspects of the disclosure.

Embodiments of a glint detection system using differential illumination are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, blue light may be defined as having a wavelength range of approximately 450 to 495 nm, and infrared light may be defined as having a wavelength range of approximately 700 nm to 1 mm.

In aspects of this disclosure, a glint may be defined as a corneal reflection that is a virtual image of a light source (e.g., infrared) that illuminates the eye and that is created by the outward facing surface (i.e., corneal surface) of the cornea. The corneal reflection is a specular reflection off of the corneal surface, which acts as a convex mirror.

Embodiments of the present disclosure include a glint detection system that uses differential illumination to reduce image saturation caused by the illumination of diffuse surfaces, such as skin, an iris, or a sclera. When a system is configured to use corneal reflections to determine the orientation of the eye, a better signal-to-noise ratio can result in more accurate detection of glints and therefore a more accurate identification of gaze orientation. Depending upon the application, accurate identification of gaze orientation can provide a more reliable, trustworthy, and enjoyable user experience. For example, a glint detection system that is integrated into an eye tracking system of a head-mounted display may be used to adjust a focal point of a display, may be used to customize user interface elements, and/or may be used to interact with or control applications that are executed with the head-mounted display.

A glint system may include one or more pairs of light sources, an image sensor, and glint detection logic, according to an embodiment. The glint detection logic may be communicatively coupled to the pairs of light sources and to the image sensor. The glint detection logic may drive the pairs of light sources to emit differential light signals with a pattern, such as a square wave. The differential light signals may be switched in opposition polarities and cause reflections on the cornea. Advantageously, by switching in opposite directions, the differential light signals cause diffuse surfaces to maintain a net illumination that is approximately constant. The image sensor (e.g., an event camera) can be configured to identify changes in an image scene while ignoring portions of the image scene that remain the same. Without using differential illumination, driving a light source with a square wave can cause the image sensor to saturate, so that glints are barely detectable or undetectable. By generating glints with the differential light signals, the image sensor detects changes in the image scene as events that represent the corneal glints with strong signal-to-noise ratios. The image sensor transmits the captured events to the glint detection logic as image data, to identify locations of the glints in the image scene or locations of the glints on the corneal surface. The glint locations may be mapped (e.g., using machine learning) to a corneal orientation and used to identify an orientation of the corneal sphere.

The glint detection system may be used in an eye tracking system that is incorporated into a head-mounted display, according to an embodiment. The eye tracking system may be configured to identify the pupil center (or other pupil characteristics) of an eye using one or more additional image sensors and light sources. The eye tracking system may use the glint locations and/or the pupil center to determine (e.g., calculate) a gaze vector or a gaze orientation. The gaze orientation may be provided to the head-mounted display to enable the head-mounted display to personalize a user's experience based on the user's gaze orientation.

The apparatus, system, and method for a glint detection system is described in this disclosure and enables improved determination of corneal sphere orientation and eye tracking in, for example, a head-mounted display. These and other embodiments are described in more detail in connection with FIGS. 1-6.

FIG. 1 illustrates an example of a glint detection system 100, according to an embodiment of the disclosure. Glint detection system 100 is configured to drive a differential illumination pattern onto a pair of light sources to generate specular reflections of the corneal surface of an eye (i.e., glints) while concurrently generating an approximately constant net illumination from diffuse portions of a user's eyes and face. The specular reflections combined with the constant diffuse illumination enables glint detection and identification of glint locations as a user's cornea moves. Glint detection system 100 is configured to reduce the amount of data captured and processed from image scenes by monitoring the changes to an image scene while ignoring the portions of the image scene that remain relatively unchanged. Advantageously, the disclosed differential lighting systems and processes enhance the detectability of corneal surface specular reflections, which enables the determination of corneal and gaze orientation, according to embodiments of the disclosure.

Glint detection system 100 includes glint detection logic 102, light sources 104 (individually, light source 104A and 104B), and image sensor 108 carried by a head-mounted frame 110, according to an embodiment. Glint detection logic 102 includes circuitry, processor logic, memory, and/or instructions that support operation of glint detection system 100. Glint detection logic 102 is communicatively coupled to light sources 104 and image sensor 108 with communication channels 112. Glint detection logic 102 may include or use an illumination pattern 114 to generate image data 106 and determine glint locations 116, according to an embodiment.

Glint detection logic 102 is configured to drive illumination pattern 114 onto light sources 104 to cause light sources 104 to emit differential light signals 118 (individually, differential light signal 118A and 118B) toward a user 120. User 120 includes diffuse surfaces and reflective surfaces. Some of the diffuse surfaces/objects include the skin, the iris, and the sclera of user 120, which are approximately Lambertian surfaces that scatter light diffusely. An eye 122 of user 120 includes a corneal surface 124. Corneal surface 124 is a specular (reflective) surface that produces a mirror-like reflection of differential light signals 118. Differential light signals 118 are diffusely scattered off of the diffuse surfaces and appear as glints in an image by reflecting off of corneal surface 124.

Differential light signals 118 include a high state H and a low state L. High state H represents a level of illumination that is greater than the level of illumination of low state L. Low state L may be the level of illumination of a light source that is turned off, and high state H may be the level of illumination of a light source that is turned on, according to an embodiment. Low state L may be the level of illumination of a light source that is turned on and emits, for example, a light signal that is less than 20-30 lumens, and high state H may be the level of illumination of a light source that is turned on and emits, for example, anything over 50 lumens, according to an embodiment. In other words, high state H and low state L may represent two different levels of illumination that image sensor 108 may be configured to distinguish between. Although example values of illumination are described in terms of lumens, digital pixel values or another metric of illumination detected by image sensor 108 may be used.

Light sources 104 emit differential light signals 118 according to illumination pattern 114, according to an embodiment. Illumination pattern 114 may define a frequency, waveform shape, and/or duty cycle of differential light signals 118. For example, differential light signals 118 may be emitted with a square wave pattern, with a duty cycle of 50% (high and low for the same duration) that is repeated at a frequency of 1 kHz. With this pattern, light source 104A may be operated to initially emit differential light signal 118A with high state H, and in a complementary configuration, light source 104B may be operated to initially emit differential light signal 118B with a low state L, prior to switching back and forth between high and low states. In some embodiments, differential light signals 118 may have a frequency in the range of 1 kHz to 2 kHz, or a frequency that is greater than or equal to 1 kHz to reduce blurring of glint detection. In an embodiment, differential light signal 118A may have a duty cycle that is less than 50% while complementary differential light signal 118B has a duty cycle that is greater than 50%. In an embodiment, the combined duty cycles of differential light signals 118 is 100%.

Light sources 104 are positioned on head-mounted frame 110 and have an intra-light source angle $\theta$, according to an embodiment. Intra-light source angle $\theta$ may be used to define how far apart light source 104A and light source 104B are positioned from each other on head-mounted frame 110. For example, as disclosed below in connection with FIG. 3, intra-light source angle $\theta$ may determine a signal-to-noise ratio (SNR) for glint detection and may determine the proximity of clusters of glints to each other. In an embodiment, light sources 104 are positioned apart from each other to define intra-light source angle $\theta$ to be at least 2.5 degrees, so clusters of glints captured by image sensor 108 are adjacent to each other and not overlapping. In some embodiments, light sources 104 are integrated into lenses of a head-mounted device, are positioned on head-mounted frame 110, or both.

Figure 2:
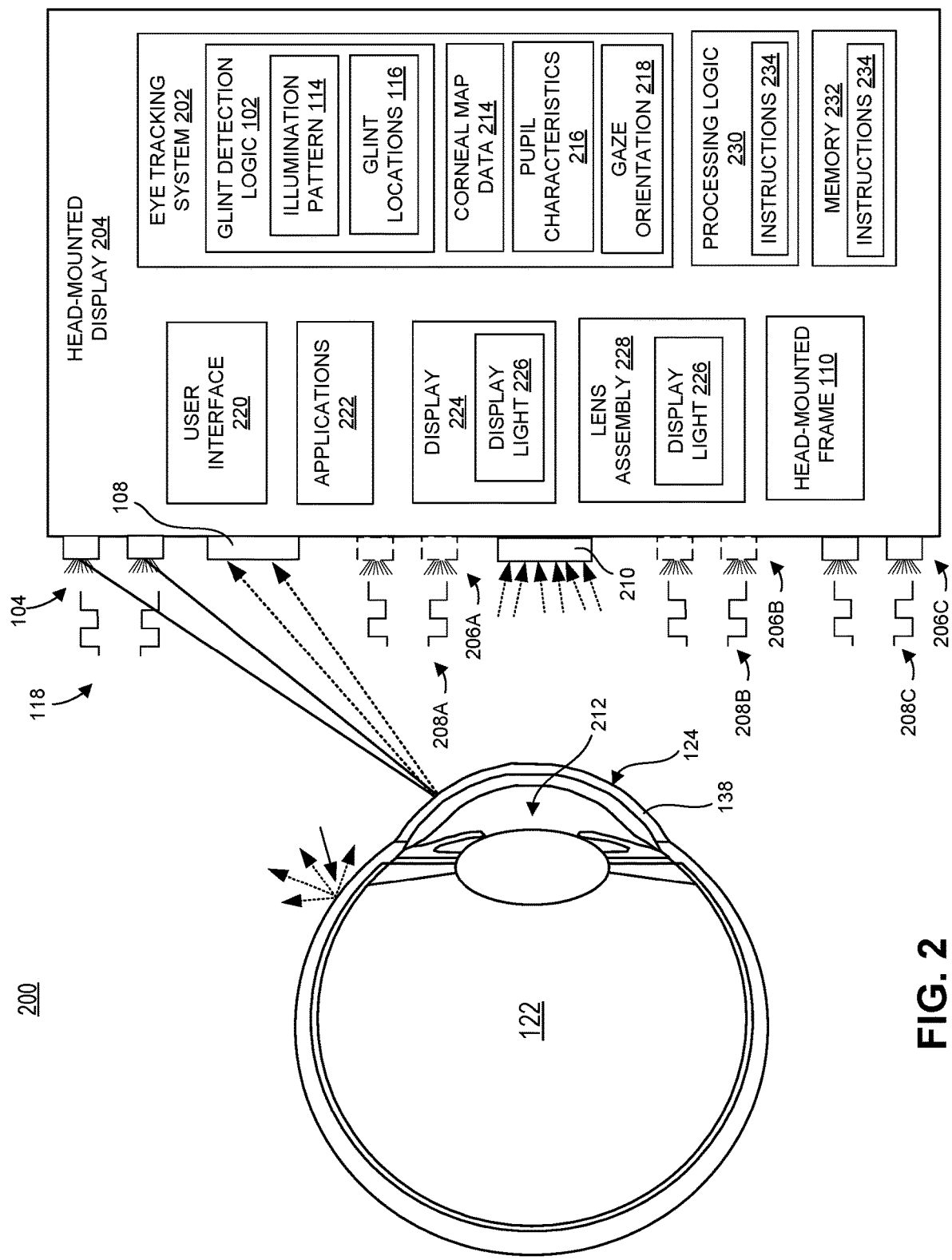
FIG. 2 illustrates an ocular environment that includes example implementations of a glint detection system, in accordance with aspects of the disclosure.

Light sources 104 may be implemented with a variety of types of light sources and in a number of configurations on head-mounted frame 110, in accordance with embodiments of the disclosure. Light sources 104 may be implemented as light-emitted diodes (LEDs), vertical external-cavity surface-emitting lasers (VCSELs), fiber optics, out-coupling gratings, or the like. Light sources 104 may be positioned to be above eye 122, below eye 122, near the nose, away from the nose, within a field of view of eye 122 (e.g., mounted or integrated into lenses of AR/VR glasses), and/or outside of a field of view of eye 122 (periphery) on head-mounted frame 110. Although a single pair of light sources 104 is illustrated and discussed in FIG. 1, multiple pairs of light sources may be incorporated into glint detection system 100, as shown in FIG. 2 and described below.

Glint detection logic 102 is configured to determine glint locations 116 at least partially based on image data 106 received from image sensor 108, according to an embodiment. Image sensor 108 is positioned on head-mounted frame 110 a distance D from eye 122. Distance D may partially be defined by hardware that mounts head-mounted frame 110 to the head of user 120. Image sensor 108 is oriented to receive reflections 126 (individually, reflection 126A and 126B) of differential light signals 118 that reflect off of corneal surface 124. Image sensor 108 includes a number of pixels 128 that are photosensitive elements that convert light into an electrical signal. Front view 130 of image sensor 108 illustrates pixels 128 arranged in an addressable pixel array 132 of rows R and columns C. Image sensor 108 may include millions of pixels (e.g., 8 megapixels) to provide resolution in glint detection.

Image sensor 108 may be implemented as an event camera, a complementary metal oxide semiconductor ("CMOS") image sensor, a charge-coupled device ("CCD") image sensor, a time-of-flight sensor, or another photosensitive sensor. When implemented as an event camera, image sensor 108 detects changes in an image scene without capturing portions of the image scene that are unchanged. More specifically, as an event camera, image sensor 108 captures data from specific pixels that are illuminated above a particular threshold of illumination. Examples of thresholds of illumination can be in terms of brightness in lumens or brightness in digital pixel values (dp). Examples of these thresholds may depend on the bit depth of the image sensor (e.g., 8 bit, 10 bit, 20 bit) and may be 50 lumens, 100 lumens, 150 lumens, 20 dp, 50 dp, 100 dp, etc. The threshold value that defines whether a glint is detected may be adjusted based on environmental noise (e.g., external sunlight), according to an embodiment. When implemented as a CMOS or CCD image sensor, image sensor 108 may include on-chip circuitry to support event-based operations that ignore portions of an image scene that remain relatively constant and that captures or transmits events associated with pixels that are illuminated to a level that exceeds a pre-determined threshold.

Image data 106 is data that represents glints or clusters of glints captured by image sensor 108. Image data 106 includes events that may represent one or more of pixels 128 that exceed a threshold. An event may include a pixel address, a time stamp, a digital pixel value, and/or a polarity (e.g., high or low). Image data 106 may be transmitted as each event is detected, may be transmitted periodically (e.g., every 10 ms), or may be transmitted each time a certain number of events are detected (e.g., every 10 events).

Front view 130 of image sensor 108 depicts an example mapping of pixel clusters that may represent glints detected by image sensor 108. Pixel cluster 134 represents a number of events or glints detected from reflection 126A of differential light signal 118A, and pixel cluster 136 represents a number of events or glints detected from reflection 126B of differential light signal 118B. Pixel cluster 134 and pixel cluster 136 represent events or glints detected around a first time t1, which may include a small period of time (e.g., 0.1 ms). Depending upon the size and/or pitch of pixels 128, detection of a single event (e.g., a change from low-to-high of one of differential light signals 118) may cause several pixels 128 to register a digital pixel value that exceeds a threshold. Glint detection logic 102 may be configured to track individual events, or glint detection logic 102 may be configured to integrate several events (e.g., 20-50 events) together prior to updating glint locations 116, according to various embodiments. Hence, pixel cluster 134 and pixel cluster 136 may be representative of a single detected event or of several integrated events, according to various embodiments. As illustrated, at a second time t2 (which may be a small period of time), pixel cluster 134 and pixel cluster 136 have, for example, changed locations within pixel array 132, which may be indicative of a change of orientation of a corneal sphere 138 of which corneal surface 124 is a part of.

Glint detection logic 102 may use one or more synchronization pulses to associate differential light signals 118 with reflections 126, according to an embodiment. For example, glint detection logic 102 may transmit a short synchronization pulse to light sources 104 and to image sensor 108 at the beginning of each period of illumination pattern 114 to correlate patterns emitted with patterns received.

Glint detection system 100 may be incorporated into one or more systems to support operations of those systems. As described above, glint detection system 100 may be configured to use differential light signals 118 and image sensor 108 (e.g., an event camera) to dynamically identify glint locations 116, which change as eye 122 changes orientation. Accordingly, glint detection system 100 may be used in an eye tracking system to determine a gaze orientation of a user and may be used in a head-mounted display (HMD) to adjust a display's focal point, brightness, user interface, etc., at least partially based on where a user's eyes are oriented within the HMD.

FIG. 2 illustrates an ocular environment 200, in accordance with embodiments of the disclosure. Ocular environment 200 illustrates features of glint detection system 100 being integrated into an eye tracking system 202 that is further integrated into an HMD 204, according to an embodiment. Ocular environment 200 includes multiple pairs of light sources and multiple image sensors included in HMD 204 to support glint detection and eye tracking.

Ocular environment 200 may include one or more pairs of light sources 206 (in addition to light sources 104) that are configured to emit differential light signals 208, according to an embodiment. Pairs of light sources 206 are mounted to head-mounted frame 110 and may be mounted in a variety of locations (e.g., periphery, in-field, etc.). Pairs of light sources 206 and light sources 104 emit light in the infrared (e.g., near infrared) wavelength range, according to an embodiment. Glint detection logic 102 may be configured to drive light sources 104 and pairs of light sources 206 with illumination pattern 114, according to an embodiment. Illumination pattern 114 may set each of differential light signals 208A, 208B, 208C, 118 to be different for each pair of light sources 206A, 206B, 206C and light sources 104. For example, illumination pattern 114 may define a different periodic frequency for each of differential light signals 118, 208A, 208B, and 208C, according to an embodiment. For example, illumination pattern 114 may define that differential light signals 118 are emitted at 1 kHz, differential light signals 208A are emitted at 1.3 kHz, differential light signals 208B are emitted at 1.6 kHz, and differential light signals 208C are emitted at 1.9 kHz. Glint detection logic 102 and/or eye tracking system 202 can be configured to correlate light sources 104 and pairs of light sources 206 with their corresponding return signals (e.g., glints or events) by, for example, applying a Fourier transform to the detected return signals to identify a frequency of the return signals, according to an embodiment.

Ocular environment 200 may also include an image sensor 210 (in addition to image sensor 108) that is configured similarly to image sensor 108 to support glint detection. In one embodiment, image sensor 210 is configured to capture images of a pupil 212. Image sensor 210 may use a dedicated light source or light source pair to capture images of pupil 212 and may be configured to capture pupil images concurrently with detected events, concurrently with the detection of a number of events (e.g., 50), and/or periodically. Image sensor 210 and image sensor 108 may include bandpass filters that pass infrared light and filter out other wavelengths.

Eye tracking system 202 may use glint locations 116, corneal map data 214, and pupil characteristics 216 to determine a gaze orientation 218, according to an embodiment. Corneal map data 214 may include correlation mappings between glint locations 116 and an orientation of corneal sphere 138, according to an embodiment. Pupil characteristics 216 may include a shape, size, or center of pupil 212 that are determined from image data from image sensor 210, for example. Eye tracking system 202 may apply various techniques to determine a vector of gaze orientation 218 that is at least partially based on, for example, pupil characteristics 216 (e.g., a pupil center) and glint locations 116, according to an embodiment.

Eye tracking system 202 may provide gaze orientation 218 to HMD 204 to support various operations, according to an embodiment. For example, HMD 204 may use gaze orientation 218 to customize user interface elements used by a user interface 220 and/or to define operations of one or more applications 222, according to an embodiment. HMD 204 may use gaze orientation 218 to at least partially drive a display 224, according to an embodiment. For example, based on gaze orientation 218, display 224 may adjust brightness, a focal point, or features included in display light 226 (e.g., user interface elements).

HMD 204 includes a lens assembly 228 that transmits display light 226 to eye 122, according to an embodiment. Lens assembly 228 may be carried by head-mounted frame 110 within HMD 204 and may include one or more lenses, grates, and/or other optical elements. One or more pairs of light sources 206 and/or light sources 104 may be integrated into lenses of lens assembly 228 to provide in-field (e.g., within a field of view of eye 122) illumination.

HMD 204 includes processing logic 230 and memory 232, according to an embodiment. Processing logic 230 and/or memory 232 may include instructions 234 that are machine-readable and executable by processing logic 230 and/or glint detection logic 102, according to various embodiments. Processing logic 230 may be communicatively coupled to image sensors 108 and 210, light sources 104, pairs of light sources 206, display 224, and glint detection logic 102 to support operation of HMD 204, according to an embodiment. Processing logic 230 may fully or partially include glint detection logic 102. Processing logic 230 may include circuitry, logic, instructions stored in a machine-readable storage medium, ASIC circuitry, FPGA circuitry, and/or one or more processors.

Figure 3:
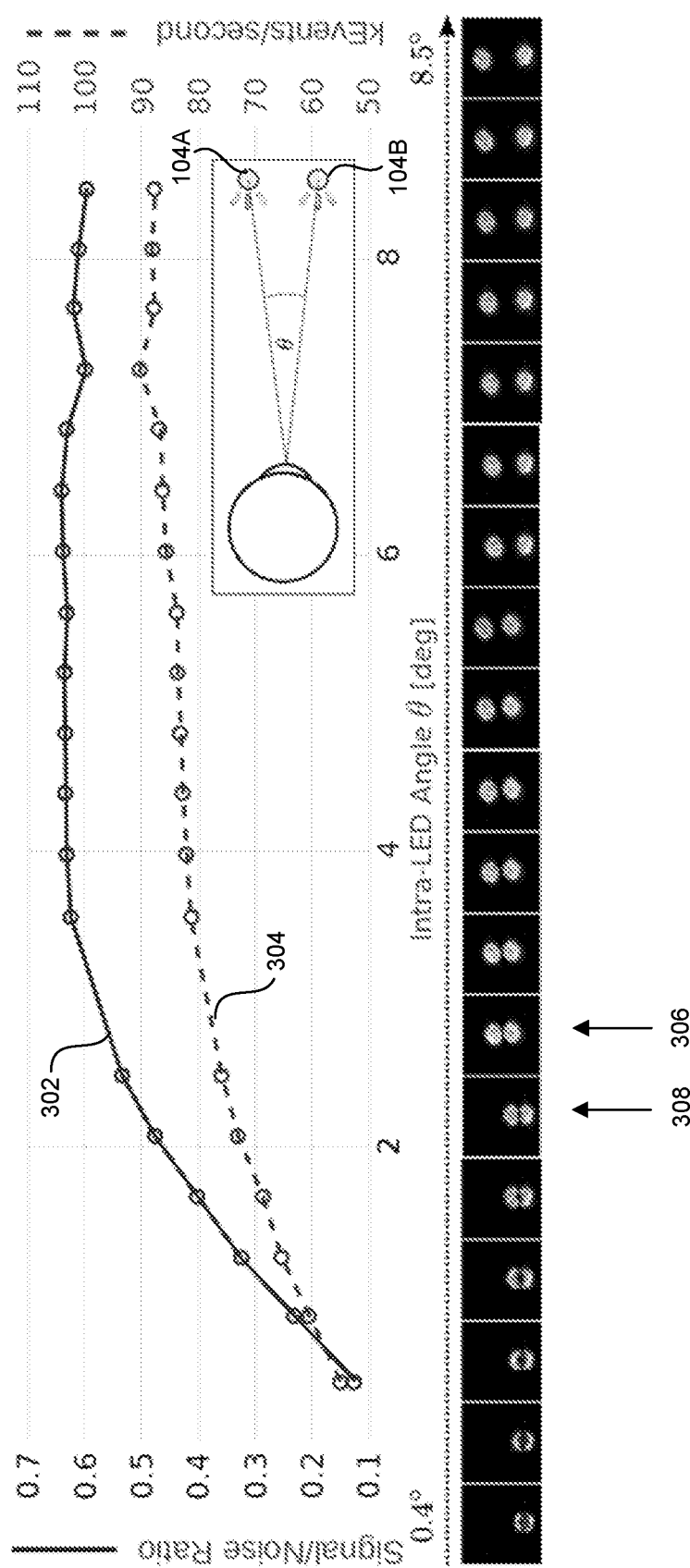
FIG. 3 illustrates an example graph of potential metrics that are based on light source spacing in the disclosed glint detection system, in accordance with aspects of the disclosure.

FIG. 3 illustrates an example graph 300 of potential operational characteristics that are based on intra-light source angle θ (shown in FIG. 1) between a light source 104A and a light source 104B, according to an embodiment. Graph 300 includes a signal-to-noise ratio (SNR) graph line 302 and an events rate graph line 304 plotted against changes in intra-light source angle θ. A type of light source that may be used in embodiments of the disclosure includes an LED, so intra-light source angle θ may be referred to as an intra-LED angle θ. As illustrated, when intra-light source angle θ is approximately 2.5 degrees, pixel clusters of glints 306 become adjacent to each other while not overlapping. As illustrated, pixel clusters of glints 308 are adjacent to each other but overlap somewhat, which may result in poorer SNR and events rate, as compared to that of pixel clusters of glints 306. One implementation of hardware may achieve adjacent (while not overlapping) pixel clusters of glints with at a 2.5 degree intra-light source angle θ. However, with different hardware implementations another intra-light source angle θ may result in adjacent (while not overlapping) pixel clusters of glints that result in an increased SNR of captured glints.

Figure 4:
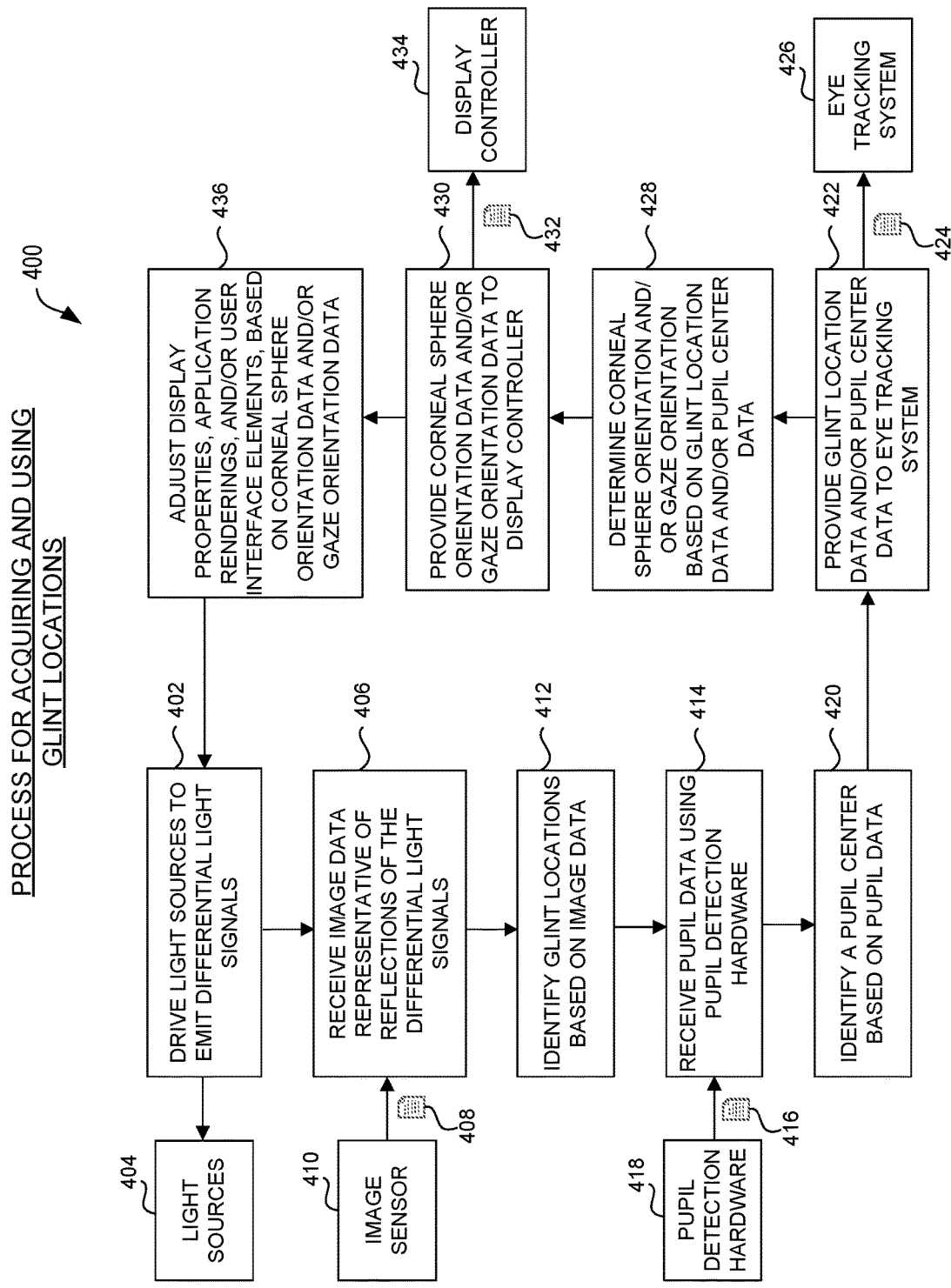
FIG. 4 illustrates a flow diagram of a process for acquiring and using glint locations, in accordance with aspects of the disclosure.

FIG. 4 illustrates a process 400 for acquiring and using glint locations, for example, in a head-mounted display or other ocular environment, according to embodiments of the disclosure. Process 400 may be incorporated into glint detection system 100, ocular environment 200, eye tracking system 202, and/or HMD 204, according to embodiments of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 402, process 400 drives light sources 404 to emit differential light signals, according to an embodiment. The differential light signals can be defined by an illumination pattern that specifies waveform shape, frequency of signaling, duty cycle, and wavelength of light emitted. Process block 402 proceeds to process block 406, according to an embodiment.

In process block 406, process 400 receives, from image sensor 410, image data 408 that is representative of reflections of the differential light signals, according to an embodiment. The differential light signals reflect off of the corneal surface of an eye and are referred to as glints. When the differential light signals change state (e.g., high-to-low or low-to-high), the change in the image scene monitored by image sensor 410 may register each changed portion of the image scene as an individual event. Image sensor 410 may be configured to register or capture an event if an illumination change (positive or negative) in the image scene changes by more than a pre-determined threshold value (e.g., 30-50 digital pixel values), according to an embodiment. Process block 406 proceeds to process block 412, according to an embodiment.

In process block 412, process 400 identifies glint locations based on image data 408, according to an embodiment. Process 400 may use machine learning (e.g., neural networks) or may use 3D maps or models of glint vs. cornea orientation to identify an orientation of the corneal sphere, according to an embodiment. Process block 412 proceeds to process block 414, according to an embodiment.

In process block 414, process 400 receives pupil data 416 using pupil detection hardware 418, according to an embodiment. Pupil detection hardware 418 may include one or more light sources and/or one or more image sensors that are positioned and configured to capture an image of a user's pupil, according to an embodiment. Pupil detection hardware 418 may be configured to generate pupil data 416 using the differential light signals emitted by light sources 404, according to an embodiment. Process block 414 proceeds to process block 420, according to an embodiment.

In process block 420, process 400 identifies a pupil center based on pupil data 416, according to an embodiment. Process 400 may use pupil data 416 to identify a pupil center of an eye using one or more 3D maps or models of an eye and/or using machine learning techniques (e.g., neural networks), according to an embodiment. Process block 420 proceeds to process block 422, according to an embodiment.

In process block 422, process 400 provides glint location data and/or pupil center data 424 to eye tracking system 426, according to an embodiment. Process block 422 proceeds to process block 428, according to an embodiment.

In process block 428, process 400 determines corneal sphere orientation and/or gaze orientation based on glint location data and/or pupil center data 424, according to an embodiment. Process block 428 proceeds to process block 430, according to an embodiment.

In process block 430, process 400 provides corneal sphere orientation data and/or gaze orientation data 432 to a display controller 434, according to an embodiment. Display controller 434 may be configured to control images and/or user experience elements, focal points, etc. that for the display. The display may be a component of, for example, a head-mounted display, according to an embodiment. Process block 430 proceeds to process block 436, according to an embodiment.

At process block 436, process 400 adjusts display properties, application renderings, and/or user interface elements, based on corneal sphere orientation data and/or gaze orientation data 432, according to an embodiment. Process block 436 proceeds to process block 402, to continue to iterate through process 400, according to an embodiment.

Figure 5:
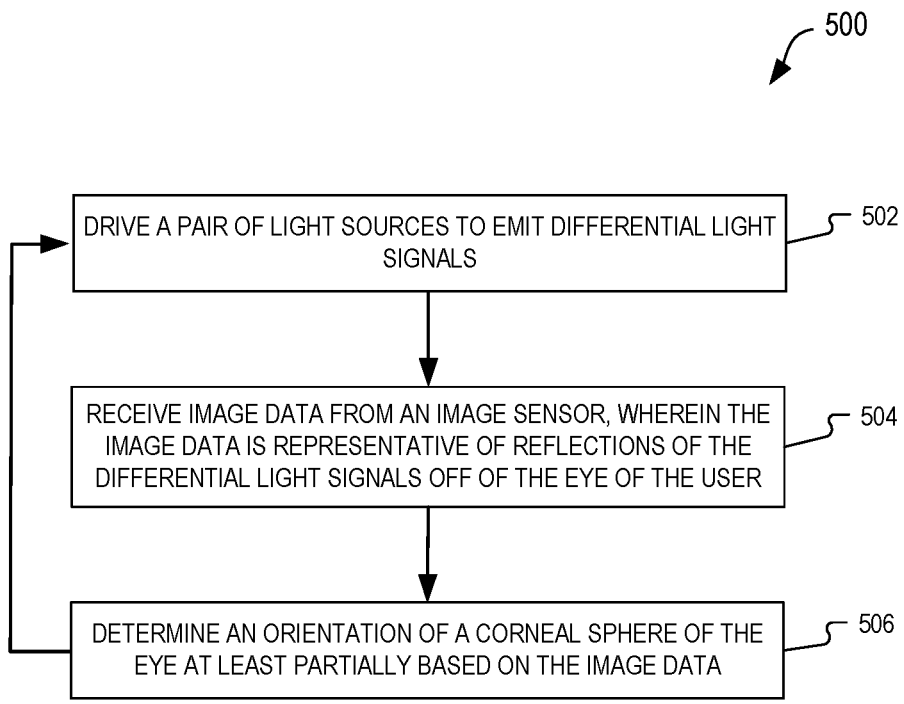
FIG. 5 illustrates a flow diagram of a process for detecting glints, in accordance with aspects of the disclosure.

FIG. 5 illustrates a process 500 for detecting glints, for example, in an eye tracking system, according to embodiments of the disclosure. Process 500 may be incorporated into glint detection system 100, ocular environment 200, eye tracking system 202, and/or head-mounted display 204, according to embodiments of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 502, process 500 drives a pair of light sources to emit differential light signals, according to an embodiment. Process block 502 proceeds to process block 504, according to an embodiment.

In process block 504, process 500 receives image data from an image sensor, wherein the image data is representative of reflections of the differential light signals off of the eye of the user, according to an embodiment. Process block 504 proceeds to process block 506, according to an embodiment.

In process block 506, process 500 determine an orientation of a corneal sphere of the eye at least partially based on the image data, according to an embodiment. Process block 506 proceeds to process block 502, to repeat process 500, according to an embodiment.

Figure 6:
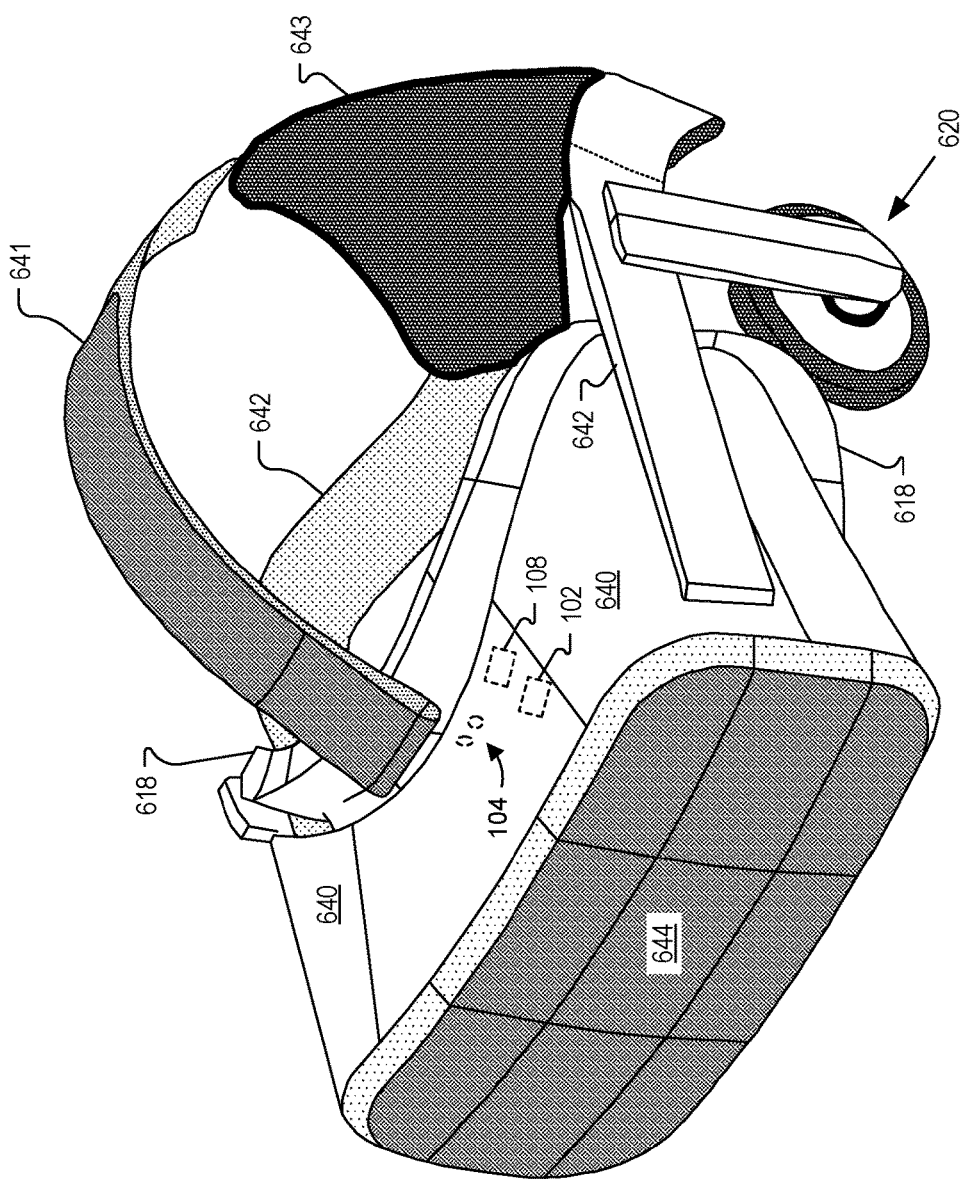
FIG. 6 illustrates a head mounted display, in accordance with aspects of the disclosure.

FIG. 6 illustrates a head-mounted device (HMD) 600, in accordance with aspects of the present disclosure. As described further below, in embodiments, HMD 600 may include a glint detection system that includes light sources 104, image sensor 108, and glint detection logic 102, as described above in connection with FIGS. 1-5. An HMD, such as HMD 600, is one type of head mounted device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. The illustrated example of HMD 600 is shown as including a viewing structure 640, a top securing structure 641, a side securing structure 642, a rear securing structure 643, and a front rigid body 644. In some examples, the HMD 600 is configured to be worn on a head of a user of the HMD 600, where the top securing structure 641, side securing structure 642, and/or rear securing structure 643 may include a fabric strap including elastic as well as one or more rigid structures (e.g., plastic) for securing the HMD 600 to the head of the user. HMD 600 may also optionally include one or more earpieces 620 for delivering audio to the ear(s) of the user of the HMD 600.

The illustrated example of HMD 600 also includes an interface membrane 618 for contacting a face of the user of the HMD 600, where the interface membrane 618 functions to block out at least some ambient light from reaching the eyes of the user of the HMD 600.

Example HMD 600 may also include a chassis for supporting hardware of the viewing structure 640 of HMD 600 (chassis and hardware not explicitly illustrated in FIG. 6). The hardware of viewing structure 640 may include any of processing logic, wired and/or wireless data interface for sending and receiving data, graphic processors, and one or more memories for storing data and computer-executable instructions. In one example, viewing structure 640 may be configured to receive wired power and/or may be configured to be powered by one or more batteries. In addition, viewing structure 640 may be configured to receive wired and/or wireless data including video data.

Viewing structure 640 may include a display system having one or more electronic displays for directing light to the eye(s) of a user of HMD 600. The display system may include one or more of an LCD, an organic light emitting diode (OLED) display, or micro-LED display for emitting light (e.g., content, images, video, etc.) to a user of HMD 600.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., processing logic 230) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memory 232) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A glint detection system comprising:
a pair of light sources positioned on a head-mounted frame to illuminate a corneal surface of an eye with differential light signals, wherein the differential light signals include two opposite light states that concurrently switch based on a pattern;
an image sensor positioned on the head-mounted frame to receive reflections of the differential light signals from the eye; and
processing logic coupled to the pair of light sources and to the image sensor, wherein the processing logic drives the pair of light sources to emit the differential light signals, wherein the processing logic receives, from the image sensor, image data that is representative of the reflections of the differential light signals, wherein the processing logic determines an orientation of a cornea of the eye at least partially based on the image data,
wherein an integration of a plurality of the reflections of the differential light signals produces a first cluster of pixels and a second cluster of pixels,
wherein a first of the pair of light sources is positioned a distance from a second of the pair of light sources so the first cluster of pixels is adjacent to the second cluster of pixels,
wherein the first cluster of pixels nearly touches the second cluster of pixels in an image map representation of the integration of the plurality of the reflections of the differential light signals.

2. The glint detection system of claim 1, wherein the image sensor is responsive to changes in brightness in a field of view of the image sensor, wherein the image data is representative of the changes in brightness.

3. The glint detection system of claim 1, wherein the image sensor is an event camera that is responsive to changes in brightness in a field of view of the image sensor.

4. The glint detection system of claim 1, wherein the differential light signals represent square-wave patterns of opposite polarity.

5. The glint detection system of claim 1, wherein the pair of light sources emit infrared light.

6. The glint detection system of claim 1, wherein the light sources emit the pattern at an illumination frequency of at least 1 kHz.

7. The glint detection system of claim 1, wherein the pattern is a first pattern, wherein a first duty cycle of the first pattern emitted by one light source in a first of the pair of light sources matches a second duty cycle of a second pattern emitted by one light source in a second of the pair of light sources.

8. The glint detection system of claim 1, wherein a first duty cycle of one light source in a first of the pair of light sources is less than 50% and a second duty cycle of one light source in a second of the pair of light sources is greater than 50% so that a sum of the first and second duty cycles is approximately 100%.

9. The glint detection system of claim 1 further comprising:
one or more additional pairs of light sources positioned on the head-mounted frame to illuminate the corneal surface of the eye with one or more additional differential light signals.

10. The glint detection system of claim 1, wherein an intra-light source angle between the pair of light sources is at least 2.5 degrees.

11. The glint detection system of claim 1, wherein the pair of light sources are light emitting diodes (LEDs), vertical external-cavity surface-emitting lasers (VCSELs), fiber optics, or out-coupling gratings.

12. A head mounted display comprising:
a display to provide display light;
a lens assembly to transmit the display light from the display to an eyebox; and
a glint detection system comprising:
a pair of light sources positioned on a head-mounted frame to illuminate a corneal surface of an eye with differential light signals, wherein the differential light signals include two opposite light states that concurrently switch based on a pattern;
an image sensor positioned on the head-mounted frame to receive reflections of the differential light signals from the eye; and processing logic coupled to the pair of light sources and to the image sensor, wherein the processing logic drives the pair of light sources to emit the differential light signals, wherein the processing logic receives, from the image sensor, image data that is representative of the reflections of the differential light signals, wherein the processing logic determines an orientation of a cornea of the eye at least partially based on the image data, wherein a first duty cycle of a first light source in the pair of light sources is less than 50% and a second duty cycle of a second light source in the pair of light sources is greater than 50% so that a sum of the first and second duty cycles is approximately 100%.

13. The head mounted display of claim 12, wherein the image sensor is responsive to changes in brightness in a field of view of the image sensor, wherein the image data is representative of the changes in brightness.

14. The head mounted display of claim 12, wherein the image sensor is an event camera.

15. The head mounted display of claim 12, wherein the differential light signals include square wave patterns that repeat at a frequency of at least 1 kHz.

16. A method of corneal glint detection using differential lighting comprising:

driving, with processing logic, a pair of light sources to emit differential light signals towards an eye of a user to cause diffuse surfaces on and around the eye to maintain a net illumination that is approximately constant, wherein the differential light signals include two opposite light states that concurrently switch based on a pattern, wherein the pair of light sources is positioned on a frame of a head-mounted device to illuminate a corneal surface of the eye with the differential light signals, wherein a first duty cycle of a first light source in the pair of light sources is less than 50% and a second duty cycle of a second light source in the pair of light sources is greater than 50% so that a sum of the first and second duty cycles is approximately 100%;

receiving, with the processing logic, image data from an image sensor positioned on the frame of the head-mounted device, wherein the image data is representative of reflections of the differential light signals off of the eye of the user; and determining, with the processing logic, an orientation of a corneal sphere of the eye at least partially based on the image data.

17. The method of claim 16, wherein driving the pair of light sources includes driving the pair of light sources to emit square waves having opposite polarities.

18. The method of claim 16, wherein the image sensor is an event sensor configured to capture events from each pixel having a digital pixel value that exceeds a threshold.

* * * * *